United States Patent [19]
Gauthier et al.

[11] Patent Number: 6,007,935
[45] Date of Patent: Dec. 28, 1999

[54] RECHARGEABLE LITHIUM ANODE FOR POLYMER ELECTROLYTE BATTERY

[75] Inventors: Michel Gauthier, La Prairie; Andre Belanger, Ste-Julie; Alain Vallee, Varennes, all of Canada

[73] Assignee: Hydro-Quebec, Montreal, Canada

[21] Appl. No.: 08/844,858

[22] Filed: Apr. 23, 1997

[30] Foreign Application Priority Data

Nov. 22, 1996 [CA] Canada .................................. 2191019

[51] Int. Cl.$^6$ ................................................. H01M 10/40
[52] U.S. Cl. .......................... 429/66; 429/162; 429/306
[58] Field of Search ............................. 429/66, 162, 192, 429/251, 252, 306

[56] References Cited

U.S. PATENT DOCUMENTS

| | | | |
|---|---|---|---|
| 4,517,265 | 5/1985 | Bélanger et al. | 429/217 |
| 4,652,506 | 3/1987 | Belanger et al. | 429/192 |
| 4,794,060 | 12/1988 | Belanger et al. | 429/209 |
| 4,897,917 | 2/1990 | Gauthier et al. | 29/623.3 |
| 5,114,804 | 5/1992 | Stiles et al. | 429/66 |
| 5,346,788 | 9/1994 | Chang et al. | 429/252 X |
| 5,418,091 | 5/1995 | Gozdz et al. | 429/252 |
| 5,528,920 | 6/1996 | Bouchard et al. | 72/205 |
| 5,629,107 | 5/1997 | Shioda et al. | 429/66 X |
| 5,648,187 | 7/1997 | Skotheim | 429/192 X |
| 5,770,331 | 6/1998 | Olsen et al. | 429/192 X |

OTHER PUBLICATIONS

Industrial Chemistry Library, vol. 5, chapter 1, pp. 1–47, (1994), J.R. Dahn, et al., "Carbons and Graphites as Substitutes for the Lithium Anode" (month n.a.).

Second International Symposium on Polymer Electrolytes, Jun. 14–16, 1989, A. Bélanger, et al., "Lithium Electrode Behavior in Polymer Electrolyte Cells".

Journal of Power Sources, vol. 54, pp. 163–169, (1995), M. Gauthier, et al., "Large Lithium Polymer Battery Development the Immobile Solvent Concept" (month unknown).

*Primary Examiner*—Stephen Kalafut
*Attorney, Agent, or Firm*—Oblon, Spivak, McClelland, Maier & Neustadt, P.C.

[57] ABSTRACT

Rechargeable generator consisting of an anode of an alkali metal or a malleable alkali alloy, at least one polymer electrolyte which is conductive with respect to alkali cations and acts as separator, as well as at least one cathode which is reversible to cations of alkali metal and its current collector. The anode comprises a thin metallic sheet, which includes at the surface thereof a passivation film SEI capable of limiting reaction between the metal and the polymer electrolyte and to exchange lithium ions. The polymer electrolyte comprises a homogeneous separator which is capable of transmitting a pressure on the anode to resist against the dendridic strain of the metal of the anode by undergoing a rate of deformation lower than 35% of its thickness. The polymer electrolyte of the separator, contains a maximum amount of species which are reactive towards lithium and which can accumulate at the surface of the anode to permit a preservation of the quality of the ionic exchanges at the interface of the anode and electrolyte and finally, the combination of anode, electrolyte, cathode and collector is maintained under a mechanical strain which is sufficient to ensure that the separator confines the anode sheet in place to preserve the integrity of the lithium-electrolyte interface during consecutive cycles of dissolution/plating.

27 Claims, 3 Drawing Sheets

FIG. 5

RECHARGEABLE LITHIUM ANODE FOR POLYMER ELECTROLYTE BATTERY

BACKGROUND OF INVENTION (1) Field of the invention

The present invention concerns a rechargeable lithium anode for polymer electrolyte batteries. More particularly, the invention is concerned with an electrochemical generator, for example a generator, which operates with an anode of lithium or other alkali metals, pure or alloyed, and a polymer electrolyte and whose characteristics are such that it is possible to substantially increase the number of cycles obtained during the normal life of the battery.

(b) Description of Prior art

The rechargeability of lithium in the presence of organic electrolytes generally leads to an important morphological evolution of the anode of an alkali metal, such as lithium resulting in a loss of utilization of the anode and/or the appearance of dendrites during recharge. This phenomenon is known to be very general with all generators in which metallic lithium is used. Reference is made to the following: Industrial Chemistry Library, Volume 5, LITHIUM BATTERIES, New Materials, Developments and Perspectives, Chapter 1, authored by J. R. Dahn et al. edited by G. Pistoia, Elsevier (1994). The generally acceptable explanation for this phenomenon is based on the following:

1—lithium is thermodynamically unstable in the presence of organic electrolytes (solvent+lithium salt) and produces an oxidation layer (which is more or less passivating and, under certain conditions, remains a conductor for lithium ions); in the latter case the passivating layer is designated SEI: Solid Electrolyte Interface;

2—during consecutive cycles of discharge and recharge, lithium is dissolved and is re-deposited unevenly and at the end, becomes electrically insulated and/or is chemically consumed, by reaction with the organic electrolyte (solvent and salt);

3—the result is a loss of activity for the anode and the formation of a porous and irregular anode consisting of dispersed lithium, which is more or less passivated.

In general, this phenomenon is compensated by increasing the capacity of the lithium anode with respect to the cathode so as to obtain a significant number of charges and discharges during cycling. The term capacity of the anode means the "coulomb" capacity, i.e., the quantity of electricity present in the anode, knowing that one mole of lithium contains the equivalent of 96,500 coulombs. Normally, this value is defined in $cm^2$, for example, 10 coulombs/$cm^2$. The capacity may also be defined in milliampere-h/$cm^2$ and the conversion is carried out as follows: 1 mAh/$cm^2$=3.6 C/$cm^2$.

The concept generally used to define the general behavior associated with the difficulty of redepositing lithium with a yield of 100% is called F.O.M. (Figure of Merit) Second International Symposium on Polymer Electrolytes, Siena, Italy, Jun. 14–16, 1989, Bélanger et al.

For these reasons, lithium anodes whose capacity is 3 to 8 times the capacity of the corresponding cathode, are generally used in secondary generators. This procedure enables to obtain a significant number of discharge/charge cycles, however, it substantially reduces the density of energy of the generator because of the penalty associated with an excess volume of lithium. Moreover, an excess of lithium substantially increases the cost of the generator. On the other hand, the risks associated with handling rechargeable Li batteries are higher when the Li excess number is higher, more so if cycling is accompanied with an important morphological evaluation of lithium which makes it more reactive.

The term "morphology" applied to lithium anodes is a description of the roughness of the surface developed during cycling. This surface roughness in some cases extends within the body of the anode when the latter becomes porous during cycling. Therefore, when the morphology of a surface is developed this also means that it becomes coarser. Many apparatuses are known for scanning the surface of an electrode to determine its roughness to ±1 micron.

It has been observed that a development of morphology of lithium may also take place in the presence of a polymer electrolyte although at a lesser degree. This observation has confirmed the evolution of the morphology of an anode of lithium, when it is cycled under repetitive conditions. Applicants have illustrated this phenomenon in a previous work (Siena, Bélanger et al., cf. supra). Relatively high F.O.M. values noted during tests made wherein F.O.M. >100, have, however, led to using an excess of lithium close to or higher than three times the capacity of the cathode.

As a consequence, relatively thick lithium sheets are generally used in metallic lithium rechargeable generators for reasons of commercial availability and ease of handling. It is also possible to use a rigid current collector which is applied against the film of lithium in order to facilitate its handling and to provide for an electrical contact.

In order to optimize the designs and performances of polymer electrolyte generators, and to provide a generator capable of storing enough energy for an electrical vehicle, the Applicant has designed a process of manufacturing lithium films which are increasingly thin. Reference is made to U.S. Pat. Nos. 4,517,265; 4,652,506; 4,794,060; and 4,897,917, as well as U.S. application Ser. Nos. 08/273,756 and 08/273,759. At the same time, Applicant has removed the rigid current collector so as to optimize the production cost and the energy density of the generators.

By way of example, Applicant has produced devices in the laboratory of a few mWh as well as other devices of more than 10 Wh utilizing lithium films without collectors in which the thickness varies between 20 and 40µ (J. Power Sources, 54 (1995) 163).

In all cases, good performances during cycling are obtained by providing an anode whose capacity is three times higher than that of the corresponding cathodes, and sometimes even more. Under similar conditions, when there are used films of lithium which are thinner and whose capacity is lower (capacity three times higher than that of the cathode), a rapid reduction of the number of cycles have been observed. After dismantling these generators, an important morphological evolution of the thin film of lithium has been noted, which is visible by a simple observation to the eye or by observation with a scanning electronic microscope. In the case of these very thin sheets, the morphological evaluation is visible throughout the entire sheet.

The morphological evolution of lithium is particularly fast under the following conditions:

1—when the excess of lithium is small;

2—when the film of lithium is thin <30µp, and 3—when lithium is free, i.e. non-supported by a rigid current collector.

These observations corroborate the tendency noted in the prior art and constitute a major limitation with respect to the optimization of the performances of generators having a metallic lithium anode, i.e., when it is intended to reduce the excess of the capacity of lithium with respect to that of the cathode, to remove the presence of a rigid collector, which is often thick and costly, or even when it is intended to reduce the thickness of the group of films constituting the generator: anode/polymer electrolyte/cathode/collector to optimize the power and the cyclability.

It is an object of the present invention to provide a rechargeable polymer electrolyte generator operating with an alkali metal anode, such as metallic lithium, and which is capable of undergoing repeated deep cycles of charge and discharge.

It is another object of the present invention to provide a generator in which the alkali metal anode has a low excess lithium capacity enabling it to preserve the reversible reaction of the anode and the electrical collection of the latter by maintaining the initial morphology without forming porous alkali metal or particles of electrically insulated metal. This characteristic of the invention is made possible by the absence of a substantial consumption of lithium by the polymer electrolyte during cycling under the conditions of the invention.

It is another object of the present invention to provide for the utilization of very thin lithium films, such as <50$\mu$, while enabling to reduce and/or eliminate the excess of metal installed with respect to the cathode, and to maintain good cycling characteristics.

It is another object of the present invention to reduce and/or eliminate the excess of capacity of the lithium anode required with generators according to the invention as compared to the prior art, in terms of security, electrochemical performance, and cost associated with this excess of capacity of the anode.

SUMMARY OF INVENTION

In accordance with the present invention there is provided a rechargeable generator including an alkali metal anode, an electrolyte comprising a solid polymer and a salt of an alkali metal, and a cathode capable of reversibly cycling the ion of the alkali metal, the anode and the electrolyte defining a sub-assembly of the generator. The sub-assembly has the following characteristics:

a—the solid polymer electrolyte contains a maximum amount of accumulated and mobile impurities which can react with the anode and can consume at the most the equivalent of 1,000 Å of lithium in a way to keep substantially intact the electrochemical characteristics of the SEI film;

b—the polymer electrolyte is homogeneous, elastic and is capable of transmitting a mechanical pressure on the anode, and of being resistant against the dendritic stress of the metal of the anode by utilizing deformations of less than 35% of its thickness.

More particularly, the invention concerns a rechargeable generator consisting of an anode of a metal, or of a malleable free alkali alloy, at least one polymer electrolyte which is conductive with respect to alkali cations and act as a separator, as well as at least one cathode and a current collector, said cathode being reversible towards cations of alkali metal and its current collector, characterized in that:

the anode consists of a thin metallic sheet, less than 100 micrometers thick, which includes at its surface a passivation film SEI, which is conductive of alkali metal ions, and is capable of limiting the reaction between said metal and the polymer electrolyte and to exchange lithium ions during consecutive cycles of charge and discharge;

the polymer electrolyte is a homogeneous separator, which resists against mechanical deformations and is capable of transmitting mechanical pressure on the anode to resist against a dendritic stress on the metal of the anode by undergoing a rate of deformation which is lower than 35% of its thickness.

the polymer electrolyte of the separator, and possibly of the cathode, when a composite cathode is used, containing a maximum amount of movable species which are reactive towards lithium and accumulated to the surface of the anode, corresponds to a consumption equivalent to less than 3000 Å of the alkali metal, so as to preserve the quality of the ionic exchanges at the anode/polymer electrolyte interface;

the assembly, i.e., alkali metal anode, electrolyte separator, cathode and collector, is maintained under a sufficient mechanical constraint so that the separator can maintain in compact form the sheet of the anode to preserve the chemical and mechanical integrity of its SEI during consecutive cycles of dissolution/plating.

In accordance with a preferred embodiment of the invention, the anode is less than 100$\mu$ thick, such as less than 40$\mu$. It is preferably made of lithium or an alloy thereof. A slight excess may also be provided to ensure electronic conductivity and lateral current collection. On the other hand, the anode may also be made of a non-supported sheet used as anode on the two faces thereof.

In accordance with another preferred embodiment of the invention, the polymer electrolyte is usually less than 50$\mu$ thick, such as less than 30$\mu$. A preferred electrolyte includes hetero-atoms, such as oxygen or nitrogen, which are capable of solvating the cations of an alkali salt which is the same alkali metal as the anode.

In accordance with another preferred embodiment of the invention, the electrolyte is capable of resisting a stress of about 200 psi at about 60° C. without undergoing more than 35% deformation while still continuing to protect the battery against short-circuit.

A preferred polymer electrolyte according to the invention has a modulus of elasticity of about 50 psi at 60° C. Preferably, the polymer electrolyte according to the invention has a density of cross-linking nucleii or has sites of chain tangling which are sufficient to limit deformability to less than 35%, such as 25% of its original thickness, and making it resistant against lithium deformation during cycling.

The properties of deformability may be obtained according to the invention by adding an inert charge into the electrolyte which is used in an amount which is sufficient to limit the above mentioned deformability and which size is preferably lower than 1 micrometer. Preferred charges comprise alumina, silica or magnesia in sizes lower than 1 micron.

The impurities which are present in the polymer electrolyte and which should be in substantially limited quantity normally may, for example, be made of movable reactive functions which are located at the ends of the polymer chains. In accordance with the invention, the amounts used should be less than those required to consume the equivalent of 1000 Å of lithium. With this amount of impurities it is possible to preserve the integrity of the passivating film at the surface of Li (SEI). The impurities may also consist of water, solvents, small amounts of polymer capable of diffusing towards Li by consuming the latter. They may also comprise protic molecules having OH or NH terminal groups (see Table I below). Control of impurities to a minimum level is essential according to the present invention because the lithium surface is not rejuvenated by evolution of the surface morphology of lithium during cycling.

The mechanical stress necessary to provide one of the characteristics of the invention may be ensured by rolling films of the anode of the electrolyte and of the cathode as coils confined in a fixed external volume, or by keeping films of the anode of the electrolyte and of the cathode under compressive load, generally between 5 and 150 psi.

Another way to provide mechanical stress is to form the anode, the electrolyte and the cathode into a prism which is kept under constant pressure or at a constant volume. For example, the prism may be obtained by flat rolling an assembly consisting of the films of the anode, electrolyte and cathode or by piling the components of the generator. Another prismatic arrangement may also be obtained by a zig-zag piling of the components of the generator. Another way to achieve the invention consists in constraining by mechanical means, the electrochemical device as a fixed volume.

According to another embodiment, the anode is a hardened anode of lithium so as to maintain the integrity of the non-supported anode sheet and to ensure current collection during cycling. The anode may also be made of an alloy with a high content of lithium which is less malleable than pure lithium and in which the excess of lithium ensures the function of non-deformable current collector.

In accordance with another embodiment of the invention, the capacity of the anode is between about 1.5 to 3.5 that of the reversible capacity of the cathode.

According to another embodiment, the anode may comprise a sheet of an alkali metal, such as lithium, or an alloy thereof, supported on a collector which adheres to the sheet. The collector may be made of a conductive metallic sheet, such as copper, iron or nickel or another metal or alloy, which is stable towards lithium. It may also be made of a sheet of plastic material, such as polypropylene or polyethylene which is also stable with respect to Li.

In accordance with another embodiment, the anode may be mounted between two half-cells made of an electrolyte and a positive electrode. It may also comprise two films of alkali metal, such as lithium, or an alloy thereof, mounted on both sides of a thin and rigid central support.

According to another embodiment a second electrolyte which is thin and adhesive may be provided between the electrolyte and the anode, or between the electrolyte and the cathode, the latter ensuring the formation of stable interfaces between the various components of the generator.

BRIEF DESCRIPTION OF DRAWINGS

Characteristics and advantages of the invention will appear from the annexed drawings given by way of illustration and without limitation and in which.

DESCRIPTION OF PREFERRED EMBODIMENTS

Figures 1, 2, 3, 4:
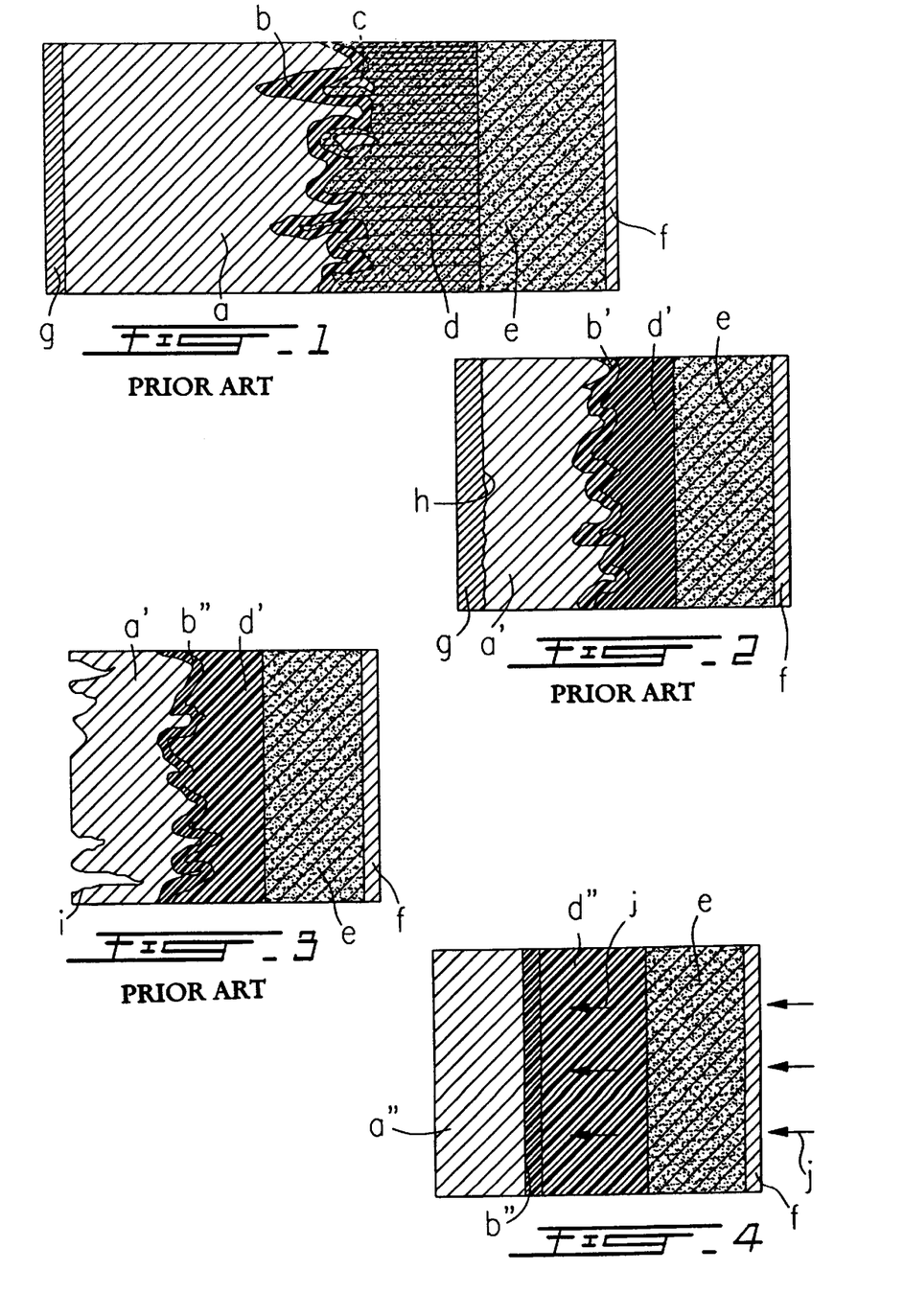
FIG. 1 illustrates the constitution of a lithium rechargeable generator using a liquid electrolyte contained in a porous separator.
FIG. 2 shows a generator utilizing a polymer electrolyte according to the prior art (Siena, Bélanger et al. supra) at a more or less advanced level of cycling with a collector on the metallic anode.
FIG. 3 shows a generator utilizing a polymer according to the prior art (Siena, Bélanger et al, supra) at a more or less advanced level of cycling without collector with deformation of the reverse side.
FIG. 4 illustrates a polymer electrolyte rechargeable generator, after dismantling and before cycling according to the invention, showing the beneficial effect of the mechanical pressure on the polymer lithium interface and the preservation of the film SEI when the polymer electrolyte is slightly deformable.

First it will be noted that the thickness of the SEI was exaggerated to facilitate its viewing. With reference to the drawings, more particularly FIG. 1, it will be seen that the illustrated generator includes an anode of Li° a, having a thickness of about $100\mu$ mounted on an anode collector g, here a sheet of copper. The generator additionally includes a composite e well known to one skilled in the art, mounted on a cathode collector f, here a sheet of nickel. Disposed between the cathode e and the Li° a, there is a liquid electrolyte d which is impregnated in a conventional porous separator. At b one sees the surface profile of the anode after cycling with its film SEI. Reference c represents particulate Li° embedded in electrically insulated electrolyte d resulting from the cycling.

Now considering FIG. 2 which illustrates a prior art generator utilizing a polymer electrolyte with a metallic collector according to the prior art (Siena, Bélanger et al. supra) at a more or less advanced level of cycling, it will be seen that the latter includes, as in the generator illustrated in FIG. 1, an anode of Li° a', except that its thickness is about $20\mu$, mounted on an anode collector g, here a sheet of copper. This generator as well as the one illustrated in FIG. 1 comprises a composite cathode e, well known to one skilled in the art, mounted on a collector f, here a sheet of nickel. Disposed between the cathode e and the Li° a', there is a polymer electrolyte d' which has been deformed by cycling of the lithium anode with its SEI film. Reference h represents the mechanical deformation of the sheet of Li° a' induced by cycles of deposit/dissolution of lithium. At b' one sees the profile surface of the anode after cycling with its film SEI.

The generator illustrated in FIG. 3 is a modification of the one illustrated in FIG. 2 in which the generator has no collector for the anode. There are, therefore, included an Li° anode a' which, in this case, is not supported, a polymer electrolyte d similar to the one illustrated in FIG. 2, a composite cathode e and its collector f. In this case the surface profile b'' of the anode surface after cycling with its film SEI is more severe than the one illustrated in FIG. 2. The reference i represents the mechanical deformation of the rear face of the sheet of Li° without collector induced by cycles of deposit/dissolution of lithium.

It should be noted that with respect to the two generators illustrated in FIGS. 2 and 3, we are dealing with rechargeable Li° generators with deformable polymer electrolyte and cycled without pressure control on the interface Li°/SEI/polymer electrolyte.

Referring now to FIG. 4, one observes that a generator according to the invention includes an anode a'' of lithium as a thin film <$30\mu$ and of a capacity lower than three times that of the composite cathode e expressed in $C/cm^2$. Between the cathode provided with a collector f, here nickel, composite e and anode a'', there is a slightly deformable polymer electrolyte separator d (SEPD) with a low content of impurities which are reactive with Li°, having a thickness lower than $30\mu$. The solid electrolyte interface, SEI, which is conductive of Li$^+$ ions is represented by reference b''.

According to the invention a pressure j is applied on the interface Li°/SEI/SEPD by means of a volume stress of the generator or an external pressure on the electrochemical device.

Figure 5:
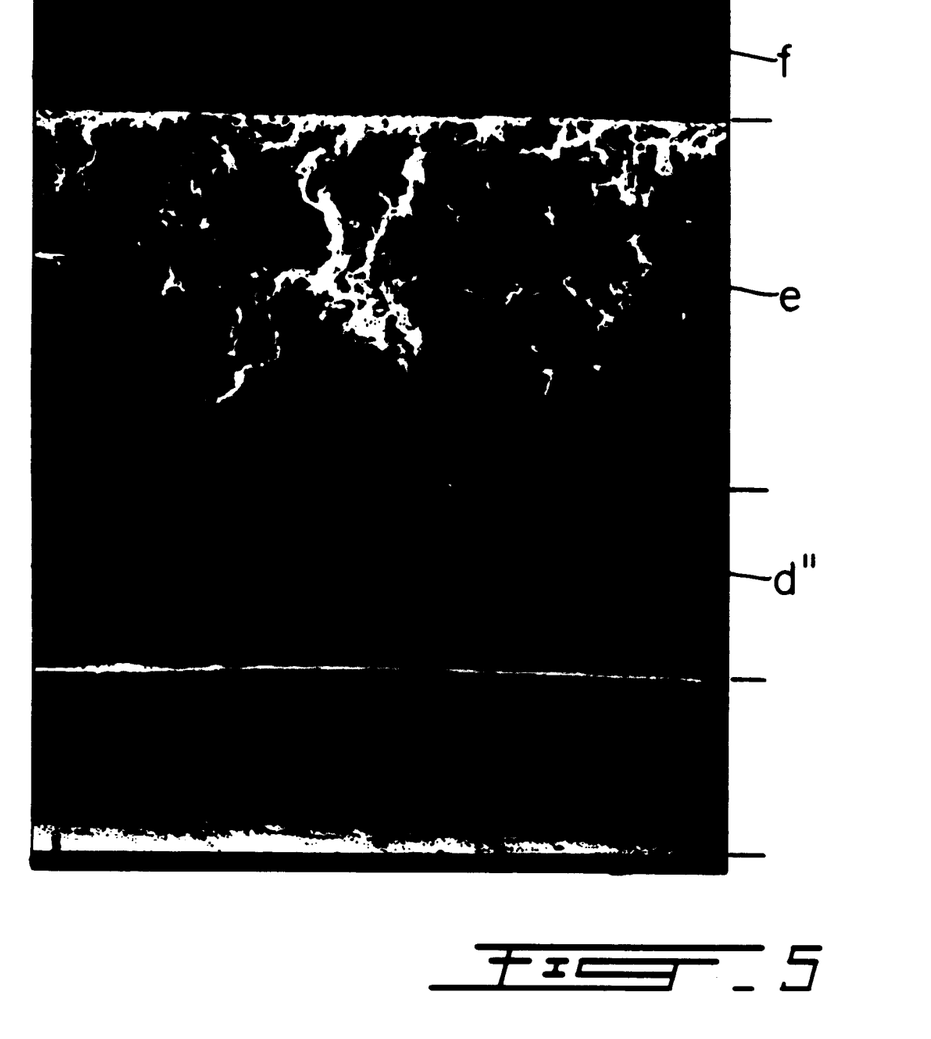
FIG. 5 shows the micrography of a cryogenic cross-section illustrating the various interfaces of a battery according to the invention, showing the preservation of the thin sheet of dense lithium and the preservation of the interface Li°/SEI/SEPD (slightly deformable polymer electrolyte separator) after many hundreds of cycles, the micrography having been realized at an enlargement of 1000.

In FIG. 5 there is the micrography of the cryogenic cross-section of cathode e mounted on its collector f, the electrolyte SPE d", a lithium anode a''' and its collector g.

Figure 6:
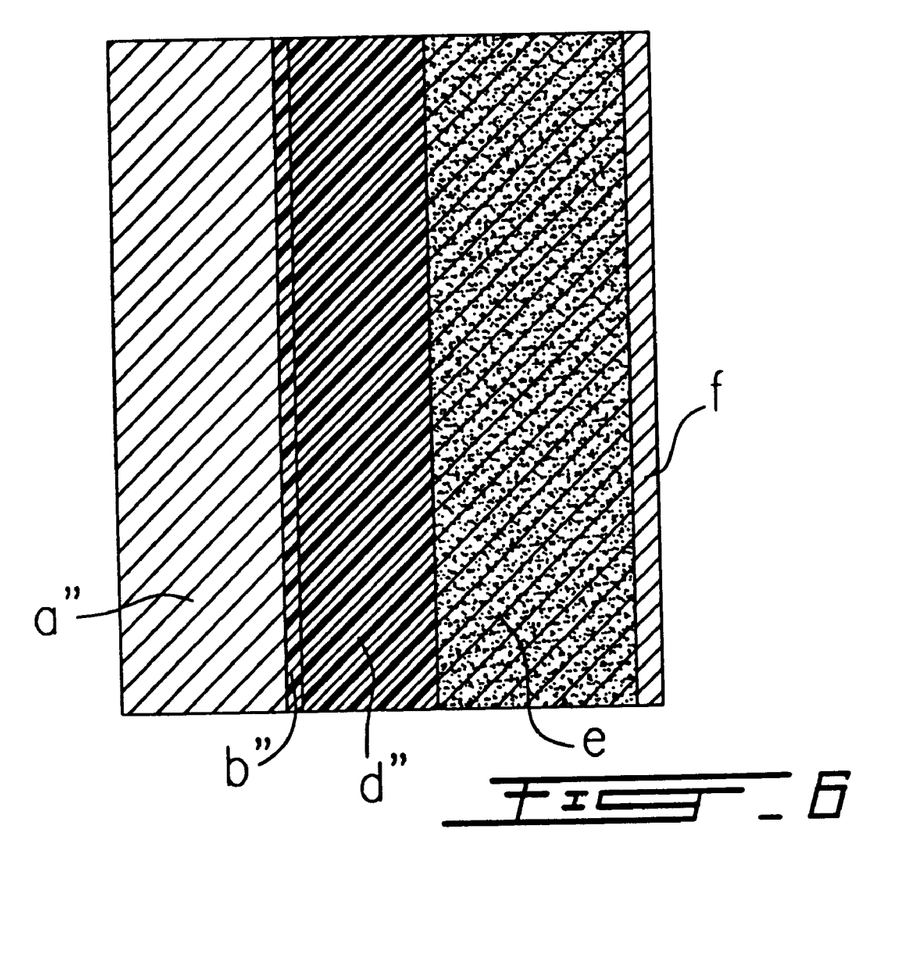
FIG. 6 is a schematic description of the cryogenic cross-section of a generator according to the invention which illustrates the preservation of the surface state of the electrolyte SEPD when dismantling after many hundreds of cycles.

The elements which constitute the generator illustrated in FIG. 6 are the same elements corresponding to the generator illustrated in FIG. 5, i.e., a lithium anode a", an interface Li°/SEI/SEPD after many hundreds of cycles b", a polymer electrolyte d" and a composite cathode e, as well as its collector f.

FIG. 1 illustrates that after many cycles of charge and discharge in a liquid medium, lithium develops a dendritic surface morphology and that particles may be detached from the surface causing lithium from becoming electrically insulated.

On the other hand, with reference to FIGS. 2 and 3 which illustrate the prior art in a polymer medium, it will be noted that after cycling, the morphology of lithium has developed, but much less than previously, since the anode is only $20\mu$ thick. No pressure was then applied.

In the case of FIG. 4 the electrolyte SEPD transmits the pressure on the anode of the generator and prevents by the same fact the development of a morphology at the surface and in depth of the lithium.

It will be shown hereinafter in some examples of the invention that after many hundreds of cycles the surface of lithium is still quite smooth and that the asperities are $<1–2\mu$.

These results confirm that the combination of pressure and a light deformability of the electrolyte-separator, SEPD, enables to maintain a thin film of lithium in a dense and uniform state.

Table 1 illustrates the effect of the concentration of terminal OH in the chains of a polymer, such as polyethylene oxide, on the average molecular weight of the latter. The reaction lithium-reactive species is calculated on the basis of a reaction of one equivalent with respect to another equivalent to evaluate the approximate thickness of the film of lithium which is chemically consumed.

TABLE 1

Quantity of reacted lithium in contact with electrolytes of various molecular weight, given a polymer density of 1.1 g/cc, an electrolyte thickness of $30\mu$, 2 OH terminal groups per chain and one Li atom reacting with each OH group.

| Molecular weight of polymer Mw | OH group concentration (moles of OH group) | Moles of OH group per $cm^2$ of electrolyte | Thickness of lithium reacted with OH groups |
|---|---|---|---|
| 5,000,000 | $2.2 \times 10^4$ | $6.6 \times 1^{-10}$ | $1 \times 10^{-5}\mu$ or 10 Å |
| 1,000,000 | $1.1 \times 10^{-3}$ | $3.3 \times 10^{-9}$ | $5 \times 10^{-5}\mu$ or 50 Å |
| 100,000 | $1.1 \times 10^{-2}$ | $3.3 \times 10^{-8}$ | $5 \times 10^{-4}\mu$ or 500 Å |
| 50,000 | $2.2 \times 10^{-2}$ | $6.6 \times 10^{-8}$ | $1 \times 10^{-3}\mu$ or 1000 Å |
| 10,000 | $1.1 \times 10^{-1}$ | $3.3 \times 10^{-7}$ | $5 \times 10^{-3}\mu$ or 5000 Å |

This Table considers only mobile species capable of reaching lithium.

This criteria has been found to be very important to preserve the nature and the electrochemical property of the SEI of solid present at the surface of the lithium film (300–500 Å). It is applicable to other sources of impurities capable of consuming Li, such as protic impurities, $H_2O$, —OH, NH—, etc. A substantial consumption of the installed lithium (quantity of coulombs/$cm^2$ contained in the lithium electrode when mounting the generator) by impurities of mobile and reactive liquids may cause the formation of a film of oxidized lithium which is too thick, non passivating or very slightly conductive through the $Li^+$ ions.

In addition to the chemical purity which is required for the polymer electrolyte, in order to preserve the quality of the Li°/solid polymer electrolyte interface during cycling, the latter should also have its own mechanical properties which enable it to be active as a mechanical separator and to preserve the geometry of the interface Li°/solid polymer electrolyte during discharge/charge cycles. The macroscopic or microscopic mechanical resistance of the polymer electrolyte enables the latter to be resistant against mechanical deformations of lithium during discharge/charge cycles and against a possible appearance of dendrites. The use of a polymer electrolyte which is capable of undergoing local mechanical deformations therefore constitutes a completely different approach from the one which is used with liquid electrolytes, where generally mechanical separation is obtained by the use of a porous separator which is impregnated with a liquid electrolyte in which the pores are generally smaller than $1\mu$. In this case, it is the porous separator which is resistant against the formation of dendrites and the deformation of the lithium anode.

The minimum mechanical properties required from the polymer electrolyte separator are determined by means of a standard penetration test which is carried out on the face of the electrolyte which is exposed to the lithium anode.

A preferred method of preparing the generator according to the present invention consists in preserving the lithium surface as well as the geometry of the Li°/solid polymer electrolyte interface by an internal confinement of the generator (cylindrical shape) and/or by controlling the pressure of the generator on the assembly.

Preferably, the generators according to the invention have a thickness of less than $200\mu$ and include a lithium anode of less than $50\mu$ thick, in which the installed capacity is lower than four times the capacity of the corresponding cathode. These generators enable to obtain a large number of deep cycles without an extended morphological evolution of the lithium anode.

This dramatically reduces preoccupations concerning security, since having dispensed with the pulverization of lithium, the dangers associated with the reactivity of highly dispersed lithium are eliminated.

The invention is illustrated by means of the following non-limiting examples.

Three types of polymers have been used for examples:

ethylene oxide base copolymers having a statistic distribution with cross-linkable allyl functions. These polymers have high molecular weight (more than 200,000) in order to confer mechanical properties to the separator and to limit the number of reactive groups at the ends of the chain (as described in U.S. Pat. Nos. 4,578,326 and 4,758,483);

an ethylene oxide base copolymer with statistical distribution and easily cross-linkable methacrylate functions. These polymers have high molecular weights (200,000) for the same reasons as above (Canadian patent application 2,111,049);

low molecular weight polymers (in the order of 10,000) having at the end of the chain multi-functional acrylate groups so as to eliminate OH groups. These easily cross-linkable polymers give mechanical properties such as low deformability associated with the high density of cross-linking nucleii (application U.S. Ser. No. 08/371,437, Jan. 11, 1995).

The types of cross-linking of these different types of polymers are given by way of examples: free radical initiation, chemical activity, thermal activity or by irradiation with Irgacure 651.

Cells of 4 cm² mounted for characterizing different examples are as follows:

the anode consists of metallic Li about 10 to 35 microns with or without Ni support;

the electrolyte membrane made from the polymers described above with $LiCF_3SO_2N$ in a concentration of O/Li=30/1 and a thickness between 10 and 30 microns;

the cathode consists of a mixture of active materials, carbon black and electrolyte in volume ratios near 40:03:57, and resting on a metallic collector generally Ni or Al, having a capacity between 1 and mAh/cm² and a thickness between 40 and 80 microns. Assembling the generator was carried out in a glove box under argon.

EXAMPLE 1

Two identical generators were mounted both including a lithium/Ni anode and a vanadium oxide base cathode. In the first generator, the 50μ thick electrolyte membrane was dried under vacuum at 80° C. for 24 hours ($H_2O$<50 ppm according to the technique of Karl Fischer). In the second generator the same membrane was exposed to ambient air for 30 minutes (water >2000 ppm) before being used in the generator. After having cycled the two generators at 60° C. for 20 cycles, the impedance of the generator measured at 25° C. has more than tripled (160 ohm-cm² vs. 50 ohm-cm²) with respect to a generator in which the electrolyte was conveniently dried.

In a second test we have added 20% polyethylene oxide in which the molecular weight was Mw=2000 containing terminal hydroxyl groups to the electrolyte. As in the previous case, in less than 15 cycles, a lithium/vanadium oxide generator cycled at 60° C. has developed an impedance higher than 200 ohm-cm² while the first generator gave an impedance lower than 50 ohm-cm².

Measure of impedance mainly attributed to the anode confirms the results contained in Table I on the effect of movable reactive impurities which can accumulate at the surface of lithium.

For the examples which follow, the water content, or the content of reactive impurities, will always be maintained below 200 ppm to preserve the electrochemical properties of SEI.

EXAMPLE 2

In this Example we have characterized four types of membranes belonging to the families of the polymers described above depending on their degree of deformability. To characterize the deformation we have used a device which measures the penetration of a tip of 7 mm under a weight of 240 g and a film thickness of the order of 40–60 microns. This test was carried out at 60° C., i.e., when the electrolyte is amorphous and corresponds to the temperature of operation of the generators.

The results are presented in Table II hereinafter. After having characterized their deformability these electrolytes were mounted as generators which are identical to those of the previous Example.

It is interesting to note that these measurements of the deformability of the separator such as presented in Table II are close to those measured under the same conditions for a sheet of metallic lithium (of the order of 20%). These values therefore illustrate the possibility of controlling the morphology of Li during cycling by means of the property of non-deformation of the separator electrolyte.

TABLE II

| Type of polymer | Crosslinking | Penetration | Hardness |
| --- | --- | --- | --- |
| Vandenberg Anioic | none | 66% | soft |
|  | slightly irradiated | 58% | soft |
| Vandenberg Anionic | 2% peroxide | 35% | semi-hard |
|  | strongly irradiated | 30% | semi-hard |
| VdB-Met-6 ERM | 2% peroxide | 20% | hard |
|  | UV | 22% | hard |
| Lithium (150 microns) |  | 20% |  |

Penetration is expressed in percentage of the thickness of membrane which is normally between 40 and 60 microns. This penetration test will be used as a semi-quantitative measurement of the deformability of separators.

The substantially equal rates of penetration between the separators of the invention and lithium suggest that a beneficial effect may be obtained whenever the Young modulus of the separator is close to or exceeds that of Li or about 80 psi.

EXAMPLE 2a

A generator was mounted with electrolyte considered as "soft", typically a VdB electrolyte of molecular weight 200,000 dried without a cross-linking agent, which has a deformation of 66% of its thickness. This corresponds to the description of FIG. 2. It was noted that after dismantling (100 cycles) there was a highly notable interpenetration of the electrolyte and lithium in spite of the presence of Cu as collector. In addition, after 50 cycles problems of coulombic efficiency have been observed. The surface of Li also had important rugosities in the order of 15 microns.

EXAMPLE 3

Three identical cells were assembled in an argon-filled glove box using the same anionic electrolyte cross-linked at 2% benzoyl peroxide and having a hardness of 30% deformation under the same load conditions described in example 2. The electrolyte is thus a semi-hard electrolyte. Lithium was 35μ thick, backed with an 8μ thick Ni current collector and its capacity in coulombs was about four times that of the cathodic material used, i.e., 1 mAh/cm² of a vanadium oxide composite electrode. These three cells were cycled under strictly the same conditions of currents and voltages, except that each cell was put under different compressive loads (pressure): 0 psi, 50 psi and 100 psi. After 100 cycles, the three cells were dismantled and examined under a Scanning Electrode Microscope (SEM). It was noted that the morphology of lithium had developed significantly with 0 psi pressure while at 50 psi, the surface had roughened a little, and the one under 100 psi load showed a lithium that was almost identical to the one used during the original assembly. This was also confirmed through a surface profilometry examination with a DEKTAK apparatus. The deformability of the electrolyte in this case was of the order as that of Li. The influence of pressure is notable but cannot completely prevent the morphological development during an extended cycling.

EXAMPLE 4

Two identical cells were assembled in an argon-filled glove box. This time an unsupported (free) lithium was used in a bi-face configuration, i.e., sandwiched between two half cells consisting of vanadium oxide cathodes of 1 mAh/cm$^2$ in capacity and films of electrolytes 35 microns thick. The free lithium was 30$\mu$ thick; the hardness of the electrolyte was 35% so it is considered a semi-hard membrane. The configuration corresponds to: positive/electrolyte/lithium/electrolyte/positive.

The total cell thickness is in the range of 200$\mu$. This configuration includes an excess of Li which is equivalent to twice the capacity of the cathode which ensures that it acts as collector. Both cells were put under identical cycling conditions: 1.5–3.3 volts as voltage limit with a 6 hour discharge regime and a 12 hour charge regime. One was cycled under a 50 psi load pressure and the other without pressure for 50 cycles. Both had excellent cycling properties: coulombic efficiencies near 100% and a high rate of utilization of the cathodic material. A post-mortem analysis has revealed that the cell that was cycled without pressure had a surface profile showing peaks and valleys of ±10$\mu$ while in the second cell, the lithium remained very uniform with a surface roughness that does not exceed ±1$\mu$.

EXAMPLE 5

Two similar cells were assembled in a dry-room in which there is less than 1% relative humidity. In the two cells measuring 3.9 cm$^2$ the same positive electrode (vanadium oxide at 5 C/cm$^2$) and the same 30 microns thick electrolyte were used. In the first case a free lithium film 20$\mu$ thick was used as the anode whereas in the second case the anode consisted of lithium 20$\mu$ thick and was laminated on a 9$\mu$ nickel foil.

After 100 cycles (C/6 discharge and C/12 charge), both cells were dismantled for examination. In the first cell, the lithium that was unsupported had developed a measurable surface morphology of the order of ±5$\mu$ and showed the presence of some encapsulated (passivated) lithium on its surface which is the result of an interpenetration of lithium and SPE during consecutive cycles (illustrated in FIG. 3). During the same period the second cell had developed substantially less rugosity. Determination of the chemical activity of lithium when reacted with methanol (by measuring the hydrogen produced) showed that Li was still a completely active event if some portion was not in electrical contact with the bulk of the electrolyte.

This Example (cell #1) shows the morphological evolution of very thin and nonsupported Li (at the surface and within the body of Li), see FIG. 3, and the loss of electrical contact resulting from cycling, since lithium remains mostly in metallic state in the presence of a dry polymer electrolyte. Cell #2 (FIG. 2), however, shows that this morphological evolution may be controlled more or less by using a collector support which adheres to the thin sheet of Li.

EXAMPLE 6

A combination of favorable factors may be used to improve the behavior of the cycling. In this Example, two similar cells were cycled under identical cycling conditions. One of the cells was put under a pressure of 50 psi, while the second cell was cycled at 0 psi. The first cell also had its lithium anode laminated on a copper current collector while the second one used a free standing lithium foil. Both cells were constructed using the same half-cell, i.e. the same composite cathode laminated to a 30 micron thick electrolyte. The capacity of the cathode was 7 C/cm$^2$. The electrolyte was semi-hard with about 30% penetration. The initial impedance of both cells was similar at 60 C. Nevertheless during cycling, the response of the first cell to peak currents was improved compared to the second cell. Similarly, the first cell showed better overall cycling behavior. After 200 cycles, both cells were dismantled and an analysis of the lithium surface roughness showed that the first cell had a better lithium morphology: ±3$\mu$ compared to ±12$\mu$ for the second cell.

EXAMPLE 7

In a similar arrangement to the previous example, two favorable effects, hardness of the electrolyte and the use of a lithium current collector, were combined to give characteristics of good power and cycling.

In the first cell a membrane of VdB methacrylate (see Table II), 30 microns thick, was used. In the case of the second cell an electrolyte ERM 35 microns thick was used with a current collector on lithium. The electrolytes were 20$\mu$ thick and had a hardness equivalent to a deformation less than 20% of their original thickness. The apparatus used was the same as the one used in Example 2 above. Each cell was kept at a pressure of 15 psi. Even after 300 cycles, the lithium surface of the two cells was substantially free of rugosity, i.e., lower than ±1 micron, and this has therefore enabled to disturb the geometrical surface of the SEI to a minimum. The surface of the electrolytes was also kept intact (FIG. 6).

EXAMPLE 8

In another 4 cm$^2$ cell, a very thin lithium anode (10$\mu$) laminated to a 10$\mu$ copper foil against a positive electrode of 6 C/cm$^2$ was used. This corresponds to an excess of about 20% of the positive electrode capacity. A 25$\mu$ hard electrolyte (20% penetration) was used, and the cell was put under a 50 psi pressure. Over 120 cycles were obtained with good retention of capacity and excellent coulombic efficiency (near 100%).

This result shows again that a good choice of material and cycling conditions can improve the cell behavior in an appreciable manner. For any given large generator based on metallic lithium, it is important to reduce the amount of lithium to a required minimum.

By doing so, the safety of the generator is greatly improved especially if an abnormal rise of temperature would take place, for example, above the melting temperature of Li.

EXAMPLE 9

The advantage obtained by combining a hard separator was also verified in a bi-face arrangement corresponding to what follows: positive electrode/electrolyte/lithium electrolyte/positive electrode. The positive electrode had a useful capacity of 5 C/cm$^2$ and the thickness of the electrolyte was 20$\mu$. The thickness of the central lithium anode was 20$\mu$ corresponding to an excess of 0.5. The hardness of the electrolyte was the same as in Example 7 above. After 100 cycles (50 psi) the cell still showed good behavior during cycling and the surface roughness of lithium was less than ±2$\mu$. Lithium preserves a continuous structure which makes it quite suitable to play its role as current collector.

EXAMPLE 10

In this last example, the same positive electrode and the same electrolyte as in Example 8 were used. As an anode, instead of using pure metallic lithium, an alloy of lithium and aluminum containing 1 at. % Al and 99 at. % of lithium was used. This small quantity of aluminum has a direct effect on the hardness of the anode. This alloy can nevertheless be laminated as thin as metallic lithium.

It has been observed that this type of lightly alloyed lithium anodes does not have an adverse effect on the cycling behavior of the anode nor on its impedance. A post-mortem analysis of the lithium surface confirms that the surface remained as smooth as pure lithium.

The combination of the various factors illustrated in the previous Examples, purity, low deformability of SPE, use of pressure or a metallic support which adheres to the electrode of Li, shows that it is possible to optimize the interface Li-polymer electrolyte during cycling and thus reduce the excess of lithium mounted in the generator.

The fact that it is possible to produce electrochemical generators with certain dry "polymer electrolytes" and a metallic lithium anode which do not chemically consume lithium led to design experimental conditions and formulations enabling to produce optimized anode/polymer electrolyte and complete electrochemical generators capable of undergoing a large number of cycles of discharge/charge without a significant evolution of the morphology of the lithium anode and without substantial modification of the interface $Li^\circ$/polymer electrolyte.

Contrary to the prior art, which is mainly interested with liquid electrolytes, it is now established that the evolution of the morphology of lithium during cycling, in the case of a liquid electrolyte, is rather the result of a mechanical operation on the thin film (stress induced by the cycles of discharge and charge) than of a passivation-chemical consumption of metallic $Li^\circ$. In the present invention one takes advantage of this specific aspect of a solid system by combining the electrolyte and mechanical pressure to keep the lithium anode in compact form during cycling.

The present invention describes the required specifications for polymer electrolytes to ensure the cyclability of lithium anodes, such as with respect to mechanical properties of deformability and their chemical compositions, i.e., low content of movable species which are reactive towards Li, such as protic solvents or low molecular weight polymers including reactive terminal groups Li. The invention also utilizes with advantage the mechanical properties of the separator electrolyte to transmit pressure on the anode of Li.

It has now been established, contrary to prior art, that it is possible to provide optimized $Li^\circ$/polymer electrolyte assemblies and rechargeable generators in which the excess of lithium with respect to the capacity of the cathode is clearly lower than 3, preferably between 1 and 2 and even lower than 1.

We claim:

1. Rechargeable generator including an anode of an alkali metal or a malleable alkali alloy, at least one polymer electrolyte, which is a conductor of alkali cations and acts as a separator, as well as at least one cathode, which is reversible towards cations of the alkali metal and its current collector, characterized in that:

the anode comprises a metallic sheet, less than 100 micrometers thick, which includes at its surface a passivation film SEI capable of limiting reaction between said metal and the polymer electrolyte and of exchanging lithium ions during consecutive cycles of charge and discharge;

the polymer electrolyte comprises a homogeneous separator which is resistant against mechanical deformations, and is capable of transmitting a pressure on the anode and to resist a dendritic stress of the metal of the anode by undergoing a rate of deformation lower than 35% of its thickness;

the polymer electrolyte separator contains a maximum amount of movable species which are reactive towards lithium and which can accumulate at the surface of the anode, corresponding to a consumption which is equivalent to less than 3000 Å of the alkali metal so as to preserve the quality of ionic exchanges at the anode/polymer electrolyte interface;

the assembly: alkali metal anode, electrolyte separator, cathode and collector is maintained under a mechanical strain which is sufficient to enable the separator to keep the anode sheet in place and to preserve the integrity of the interface lithium-polymer electrolyte during consecutive cycles of dissolution/plating.

2. Rechargeable generator according to claim 1 characterized in that said anode has a thickness lower than 40 micrometers.

3. Rechargeable generator according to claim 1 characterized in that the rate of deformation of the electrolyte is lower than 25% of its thickness.

4. Rechargeable generator according to claim 1 characterized in that said anode consists of lithium or a malleable alloy thereof.

5. Rechargeable generator according to claim 1 characterized in that an excess of said anode is also used as a current collector of the sheet.

6. Rechargeable generator according to claim 1 characterized in that said anode consists of a non-support sheet used as anode on both faces thereof.

7. Rechargeable generator according to claim 1 characterized in that the polymer electrolyte has a thickness lower than $30\mu$.

8. Rechargeable generator according to claim 1 characterized in that said polymer electrolyte includes oxygen or nitrogen donor hetero-atoms capable of solvating cations of a salt of the same alkali metal as the anode.

9. Rechargeable generator according to claim 1 characterized in that said polymer electrolyte has a Young modulus of the order of 50 psi, or substantially the Young modulus of metallic lithium.

10. Rechargeable generator according to claim 1 characterized in that said polymer electrolyte has a density of cross-linking nucleii or sites of chain tangling sufficient to limit deformability to less than 35% of its original thickness, and making it resistant to deformation of lithium during cycling.

11. Rechargeable generator according to claim 1 characterized in that the polymer electrolyte comprises a filler which is inert towards alkali metal which contributes to said hardness and the size of which is lower than 1 micrometer.

12. Rechargeable generator according to claim 11 characterized in that said filler comprises alumina, silica or magnesia.

13. Rechargeable generator according to claim 1 in which the electrolyte comprises an amount of impurity or movable reactive groups lower than the equivalent of 1000 Ansgstroms of consumed Li.

14. Rechargeable generator according to claim 1 characterized in that the mechanical stress is a pressure exerted on the anode of the generator by the separator and varies between 5 and 150 psi.

15. Rechargeable generator according to claim 1 characterized in that said mechanical strain is ensured by winding sheets of the anode, the electrolyte and the cathode in the form of coils which are confined within a fixed external volume.

16. Rechargeable generator according to claim 1 characterized in that the anode, electrolyte and the cathode are formed into a prism which is maintained under a constant pressure or at a constant volume.

17. Rechargeable generator according to claim 16 characterized in that the prism is obtained by flat winding sheets of anode, electrolyte and cathode by zig-zag stacking.

18. Rechargeable generator according to claim 1 characterized in that said anode is a hardened anode of lithium so as to maintain the integrity of the non-supported anode sheet and to ensure current collection during cycling.

19. Rechargeable generator according to claim 1 characterized in that the lithium anode is an alloy that is less malleable than pure Li, and an excess of lithium in the anode enables the anode to act as a non-deformable current collector.

20. Rechargeable generator according to claim 1 characterized in that the capacity of the anode is between about 1.5 to 3.5 times the reversible capacity of the cathode.

21. Rechargeable generator according to claim 1 characterized in that the anode comprises a sheet of alkali metal or an alloy of the latter supported on a collector which adheres to said sheet.

22. Rechargeable generator according to claim 1 supported on a sheet of plastic, the plastic being selected from a group consisting of polypropylene and polyethylene.

23. Rechargeable generator according to claim 22 characterized in that said collector comprises a thin sheet of Cu, Fe or Ni.

24. Rechargeable generator according to claim 1 characterized in that the anode is mounted between two half-cells consisting of electrolyte and a positive electrode.

25. Rechargeable generator according to claim 1 characterized in that the anode comprises two films of alkali metal or an alloy thereof mounted on both sides of a rigid central support.

26. Rechargeable generator according to claim 1 characterized in that a second electrolyte which is adhesive is provided between said electrolyte and said anode, or between said electrolyte and said cathode, said second electrolyte ensuring the formation of stable interfaces between the various components of the generator.

27. Combination of an anode of a metal or a malleable alkali metal and at least one polymer electrolyte which is conductive of alkali cations acting as separator for a rechargeable generator characterized in that:

the anode comprises a metallic sheet, less than 100 micrometers thick, which includes at its surface a passivation film SEI capable of limiting reaction between said metal and the polymer electrolyte and of exchanging lithium ions during consecutive cycles of charge and discharge;

the polymer electrolyte comprises a homogeneous separator which is resistant against mechanical deformations, and is capable of transmitting a pressure on the anode and to resist a dendritic stress of the metal of the anode by undergoing a rate of deformation lower than 35% of its thickness;

the polymer electrolyte separator contains a maximum amount of species which are reactive towards lithium and which accumulate at the surface of the anode enabling to preserve the quality of ionic exchanges at the anode/polymer electrolyte interface;

the combination anode of alkali metal, and separator electrolyte, is kept under a sufficient mechanical strain so that the separator maintains the anode sheet in place and preserves the integrity of the interface lithium-electrolyte during consecutive cycles of dissolution/plating of a generator including said combination anode.

* * * * *